J. McCALLEY.
WINDMILL.
APPLICATION FILED JUNE 11, 1909.
1,003,630.
Patented Sept. 19, 1911.
2 SHEETS—SHEET 1.
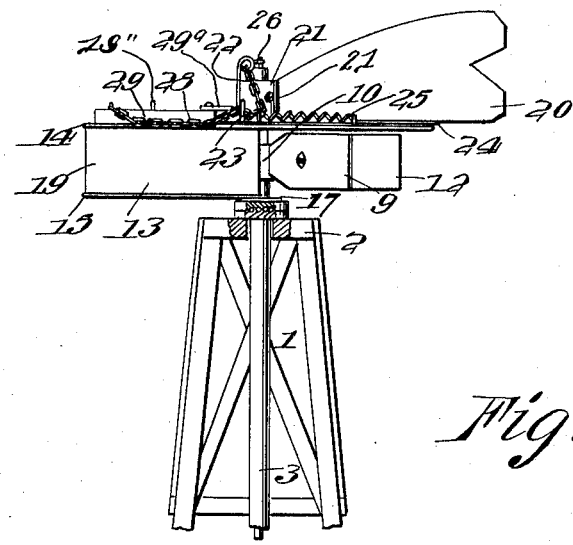
Fig. 1.
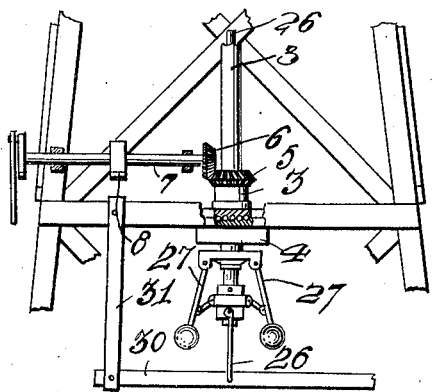
Fig. 2.
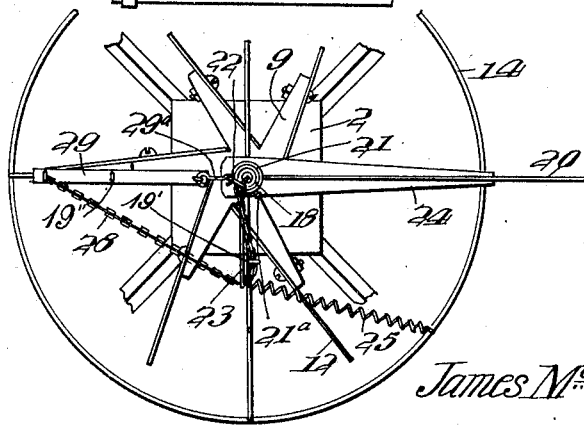
Witnesses
Inventor
James McCalley
by H. B. Wilson & Co.
Attorneys

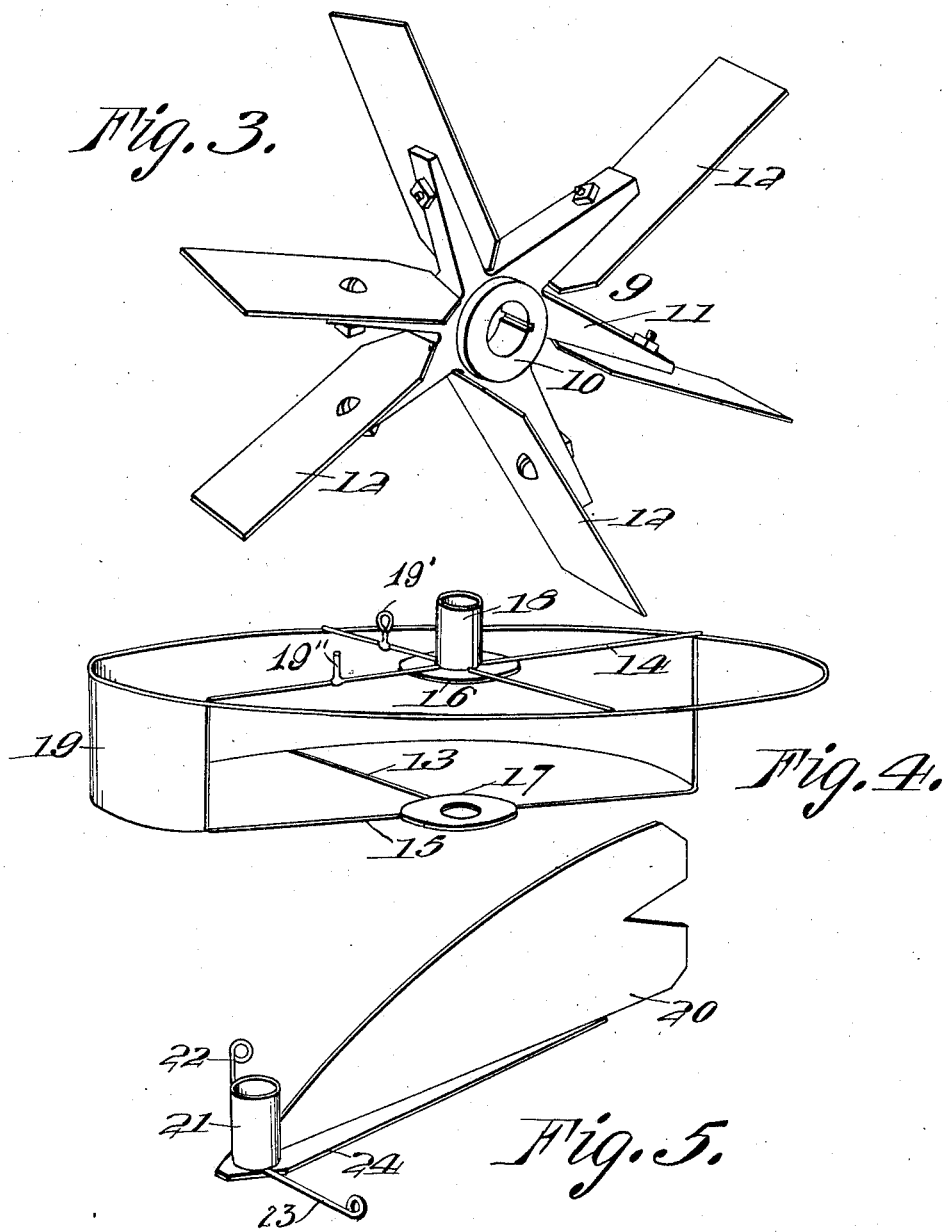

UNITED STATES PATENT OFFICE.

JAMES McCALLEY, OF CORNING, IOWA, ASSIGNOR OF ONE-THIRD TO HENRY H. CAMPBELL AND ONE-THIRD TO JESSIE M. CAMPBELL, OF CORNING, IOWA.

WINDMILL.

1,003,630. Specification of Letters Patent. Patented Sept. 19, 1911.

Application filed June 11, 1909. Serial No. 501,649.

*To all whom it may concern:*

Be it known that I, JAMES McCALLEY, a citizen of the United States, residing at Corning, in the county of Adams and State of Iowa, have invented certain new and useful Improvements in Windmills; and I do declare the following to be a full, clear, and exact description of the invention, such as will enable others skilled in the art to which it appertains to make and use the same.

This invention relates to windmills in which the power or wind wheel is partially incased and arranged to revolve in a horizontal plane.

The object of the invention is to provide simple and efficient means for automatically controlling the number of wings or blades exposed to the action of the wind, the arrangement being such that when the velocity of the wind becomes excessive, the vanes on the side of the tower exposed to the force of the wind are partially or entirely covered, thus controlling the speed of the shaft on which the wheel is mounted and the mechanism driven thereby.

With the foregoing and other objects in view, the invention consists of certain novel features of construction, combination and arrangement of parts, as will be more fully described and particularly pointed out in the appended claims.

In the accompanying drawings, Figure 1 is a side elevation of this improved windmill with parts broken out; Fig. 2 is a top plan view thereof; Fig. 3 is a perspective view of the power wheel detached; Fig. 4 is a similar view of the shield or casing; Fig. 5 is a similar view of the tail vane.

In the embodiment illustrated, the wind or power wheel is supported on an ordinary windmill tower or frame 1 having a platform 2 at its top provided with a central aperture, through which a hollow shaft 3 extends. The lower portion of the tower is provided with a brace 4 through which the shaft 3 also extends, ball bearings being preferably provided for said shaft where it passes through said platform and brace. The shaft 3 carries near its lower end a beveled gear 5 which meshes with a similar gear 6 carried by a horizontal shaft 7 which is rotatably mounted in bearings carried by the tower 1 and which is preferably provided with a pulley 8 for transmitting power to the mechanism to be driven.

A wind or power wheel 9 is keyed to the upper end of the shaft 3 above the platform 2 and is preferably constructed as shown with a hub 10 having arms 11 extending obliquely therefrom with a wing or blade 12 bolted to one face of each of said arms the wings or blades extending in planes tangential to the periphery of the hub. The hub 10 of this wheel 9 is keyed to the shaft 3 between the bearing members of a revoluble shield 13 now to be described. This shield 13 is preferably composed of vertically spaced upper and lower skeleton or spider frames 14 and 15 having centrally disposed registering apertured plates 16 and 17 adapted to encircle the shaft 3 above and below the hub of the wheel 9. The upper plate 16 has a sleeve 18 extending upwardly therefrom for a purpose to be described. A semi-cylindrical vertically disposed shield plate 19 is secured to the periphery of and connects the two spider frames 14 and 15 and is adapted to extend half way around the periphery of the wheel 9, said shield being revoluble to adapt it to be moved to cover or partially cover the wings on any desired side of the tower to expose only a desired number of the blades to the action of the wind to regulate the speed of the machinery driven thereby.

A tail vane 20 extends laterally from a sleeve 21 which fits over and turns on the sleeve 18 of the shield frame and is held in position against vertical displacement by any suitable means. Upright and horizontal arms carrying loops 22 and 23 respectively extend from said sleeve 21 for a purpose to be described. A plate 24 also extends from the lower end of said sleeve 21 over the top of the casing to cause it to run smoothly thereon. A coiled spring 25 is attached at one end to the loop arm 23 of the vane 20 and at its other end to the shield member 14, and is designed to return the shield to normal position as hereinafter described.

A rod 26 extends through the hollow shaft 3 and is connected at its lower end with a ball governor 27 of ordinary construction which is mounted on the shaft 3 and swiveled to the rod 26. The upper end of the rod 26 is connected to one end of a chain 28 which extends through the loops 22 and 23 of vane 20 and is connected to stud 19' of the shield frame. This chain is also connected to the free outer end of a lever 29 fulcrumed intermediately of its ends at 19" on the upper spider frame 14 and the other end of said lever is connected by a link 29ª to the loop arm 22 to pull the shield 13 around as the vane 20 will stand square with the wind. When the rotation of the shaft 3 becomes excessive under an increased velocity of the wind, the balls of the governor fly outward and draw the rod 26 down, thereby exerting a pull on the chain 28 and causing the shield plate 19 to move over a desired number of the exposed vanes or blades of the wheel 9 thereby shutting off the wind and reducing the speed of the mill. When the governor drops to normal position, the spring 25, against the tension of which the shield was turned, restores said shield to normal position.

A lever 30 is fulcrumed at one end to a bracket 31 depending from the cross bar 4 and is connected intermediately of its ends to the lower end of rod 26 and is operable to provide for the lowering of said rod to move the shield 13 to shut off the wind when desired, for instance during a storm.

It will be obvious that this mill may be mounted on any desired supporting structure, such as a barn, shed or the like.

Having thus described my invention, what I claim is:

1. In a windmill, a supporting structure, a hollow perpendicular shaft mounted to revolve in said structure, a horizontally disposed wind wheel fixed to said shaft, a semicircular shield revolubly mounted on said shaft around said wheel, a tail vane mounted to revolve independently of said shield, a rod extending through said shaft and provided with a ball governor at its lower end, a lever fulcrumed intermediately of its ends on said shield, and having one end connected with said vane and a flexible element connected at one end with the upper end of said rod and at its other end with the free end of said lever to provide for the turning of the shield on the actuation of said governor.

2. In a windmill, a supporting structure, a hollow perpendicular shaft mounted to revolve in said structure, a horizontally disposed wind wheel fixed to said shaft, connecting spider frames mounted on said shaft above and below said wheel and revoluble independently of said wheel, the upper frame having an upwardly extending sleeve, a semicircular plate connected at its opposite edges with a portion of the periphery of said frames, a tail vane having a sleeve or hub revolubly mounted on the sleeve of said upper spider frame, a rod extending through said shaft, a ball governor mounted on said shaft and connected with said rod at its lower end, a lever fulcrumed on said upper spider frame, an element connecting one end of said lever to the sleeve of said tail vane, an upwardly extending eye on said upper spider frame, and a flexible element connecting with the free end of said lever and extending through said eye and connecting with the upper end of said rod.

3. In a windmill, a supporting structure, a hollow perpendicular shaft mounted to revolve in said structure, a horizontally disposed wind wheel fixed to said shaft, connected spider frames mounted on said shaft above and below said wheel and revoluble independently of said wheel, the upper frame having an upwardly extending sleeve, a semicircular plate connected at its opposite edges with a portion of the periphery of said frames, a tail vane having a sleeve or hub revolubly mounted on the sleeve of said upper spider frame, a rod extending through said shaft, a ball governor mounted on said shaft and connected with said rod at its lower end, a lever fulcrumed on said upper spider frame, an element connecting one end of said lever to the sleeve of said tail vane, a flexible element connected with the free end of said lever and with the upper end of said rod, and a coiled spring connected at one end to said vane for returning said shield to normal position after actuation by said governor.

In testimony whereof I have hereunto set my hand in presence of two subscribing witnesses.

JAMES McCALLEY.

Witnesses:
W. W. LANELY,
W. E. LEE.

---

Copies of this patent may be obtained for five cents each, by addressing the "Commissioner of Patents, Washington, D. C."